(No Model.) 5 Sheets—Sheet 1.
J. MATTHEWS.
APPARATUS FOR CHARGING PORTABLE FOUNTAINS WITH AERATED BEVERAGES.
No. 246,967. Patented Sept. 13, 1881.
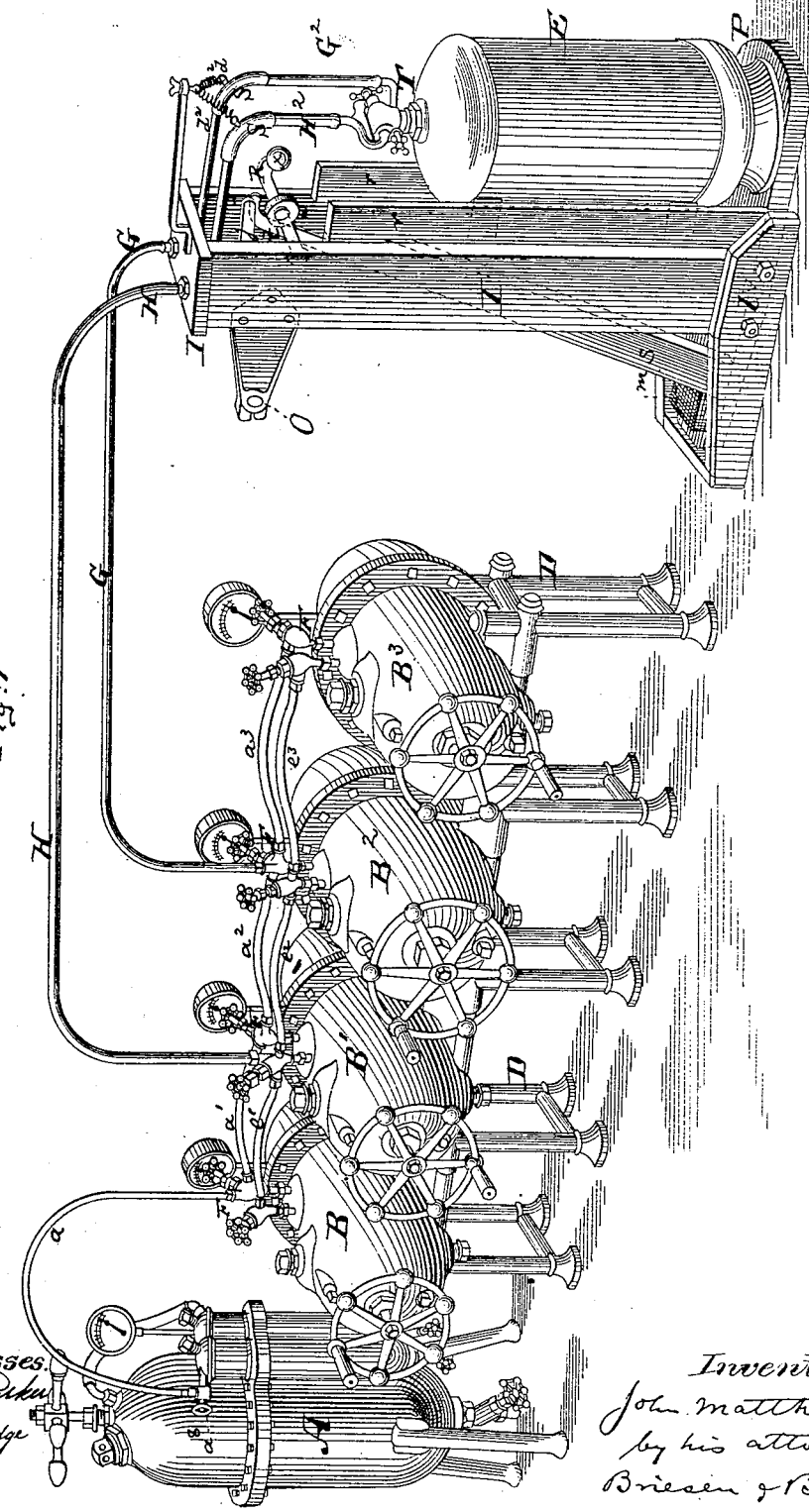

(No Model.) 5 Sheets—Sheet 2.
J. MATTHEWS.
APPARATUS FOR CHARGING PORTABLE FOUNTAINS WITH AERATED BEVERAGES.
No. 246,967. Patented Sept. 13, 1881.
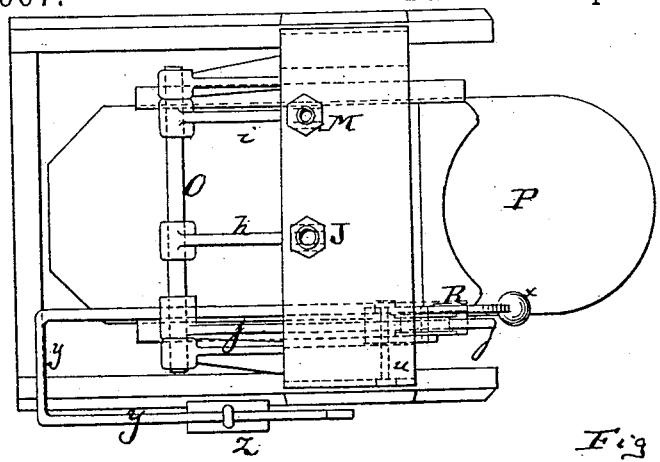
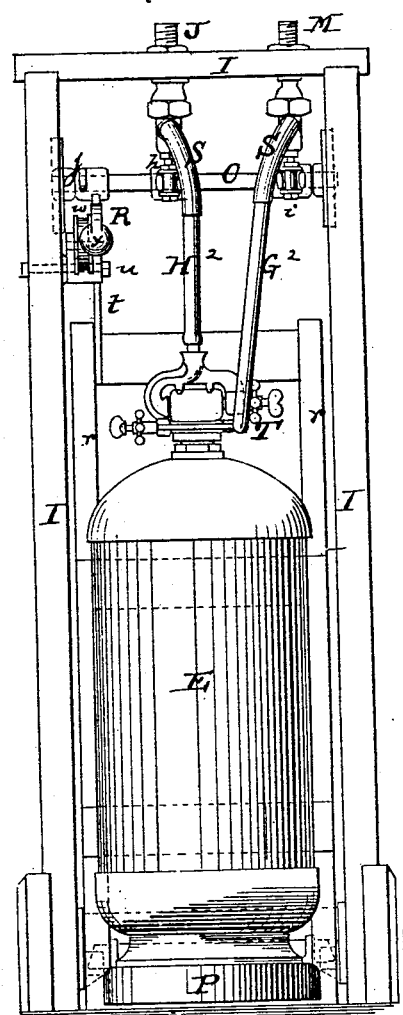
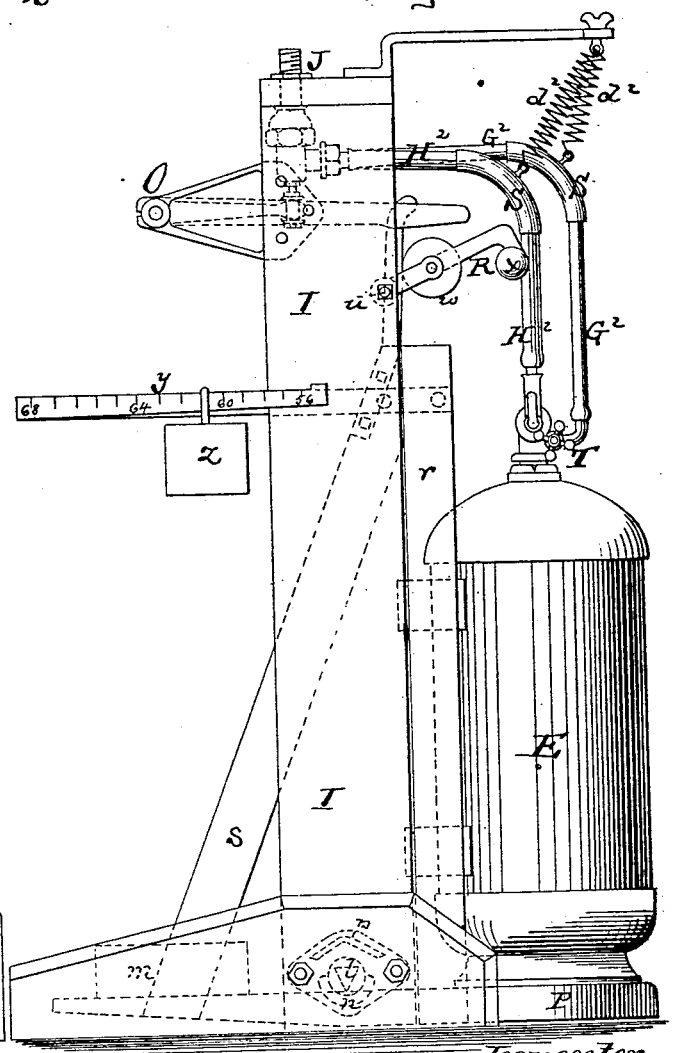

(No Model.) 5 Sheets—Sheet 3.
J. MATTHEWS.
APPARATUS FOR CHARGING PORTABLE FOUNTAINS WITH AERATED BEVERAGES.
No. 246,967. Patented Sept. 13, 1881.
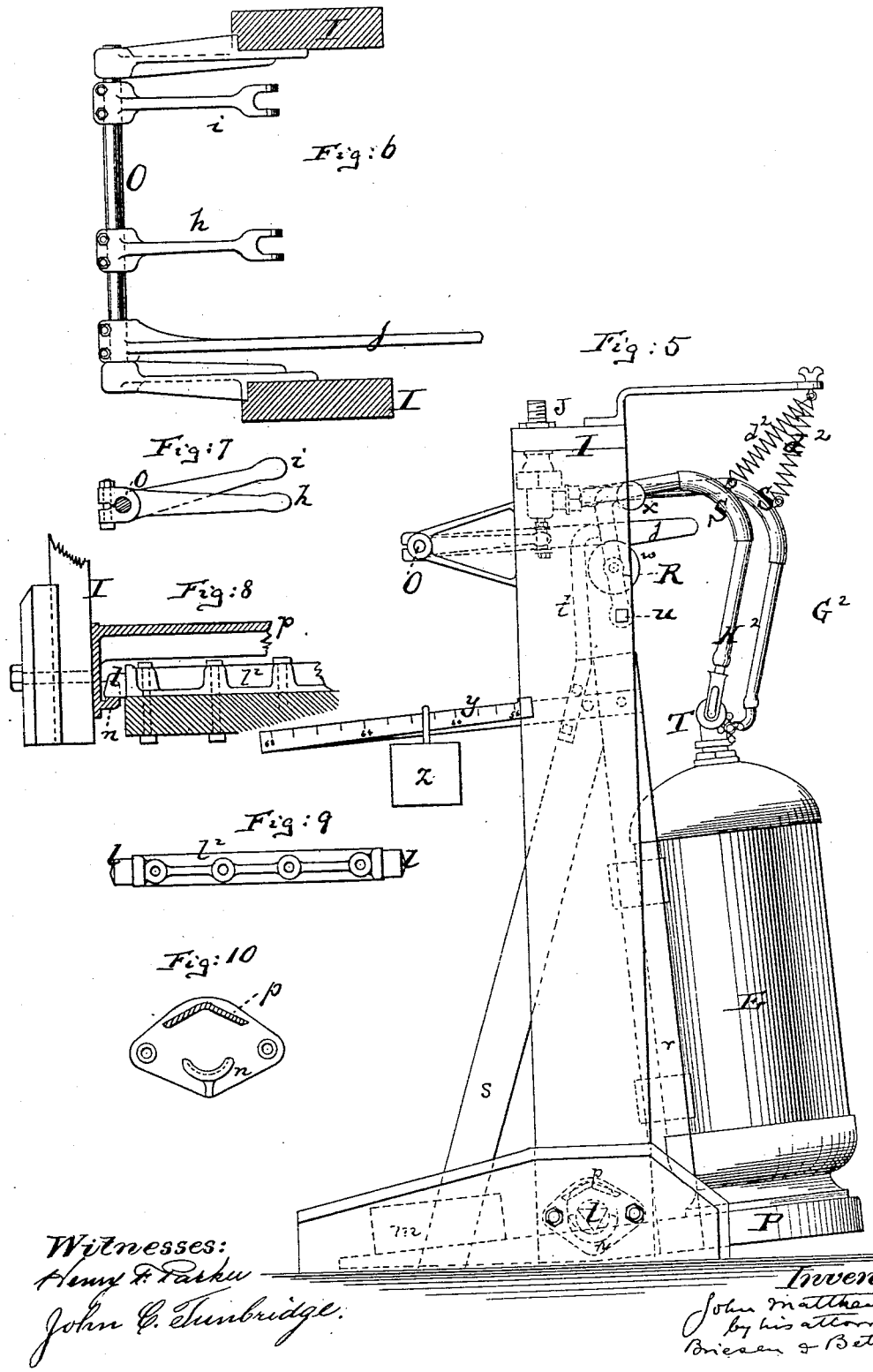

(No Model.) J. MATTHEWS.
APPARATUS FOR CHARGING PORTABLE FOUNTAINS WITH AERATED BEVERAGES.
No. 246,967. Patented Sept. 13, 1881.
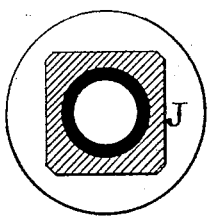
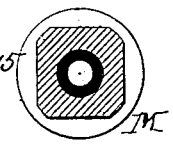
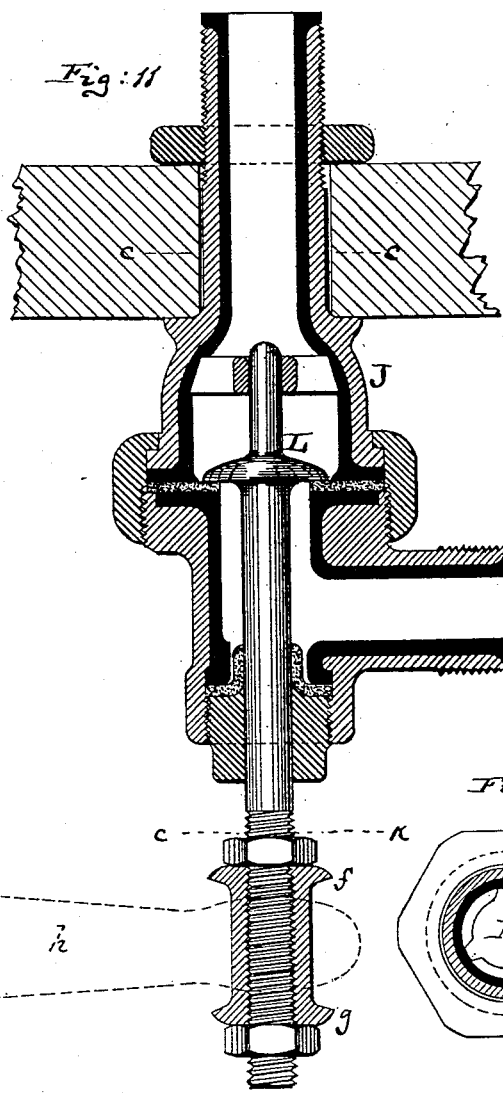
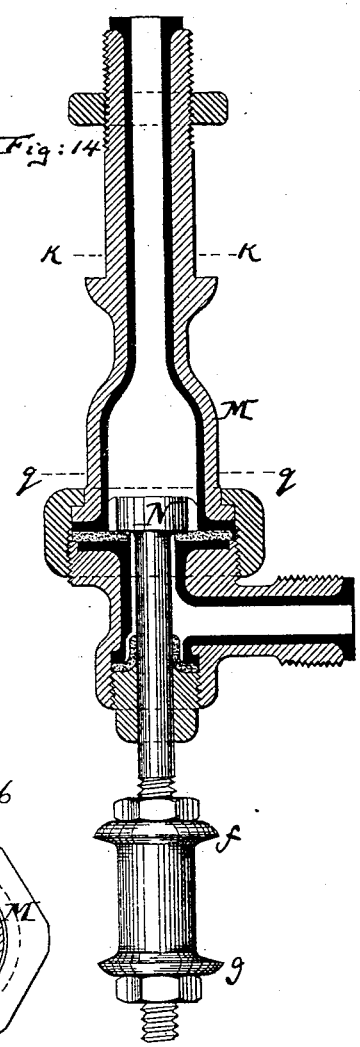
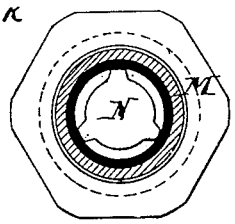
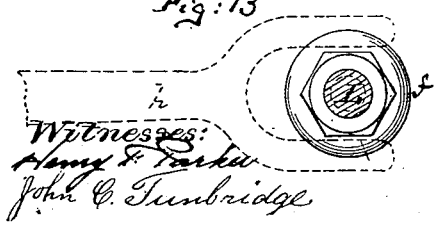
Inventor.
John Matthews
by his attorneys
Briesen & Betts (No Model.) 5 Sheets—Sheet 5.
J. MATTHEWS.
APPARATUS FOR CHARGING PORTABLE FOUNTAINS WITH AERATED BEVERAGES.
No. 246,967. Patented Sept. 13, 1881.
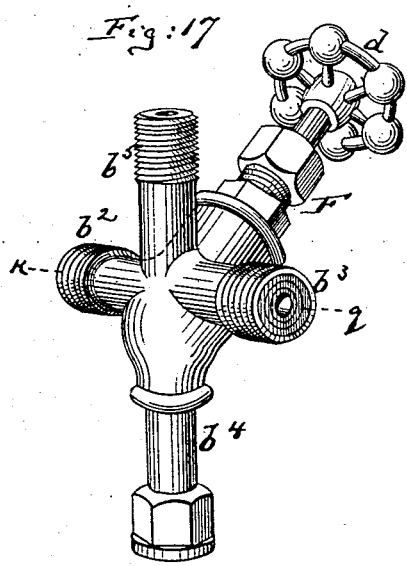
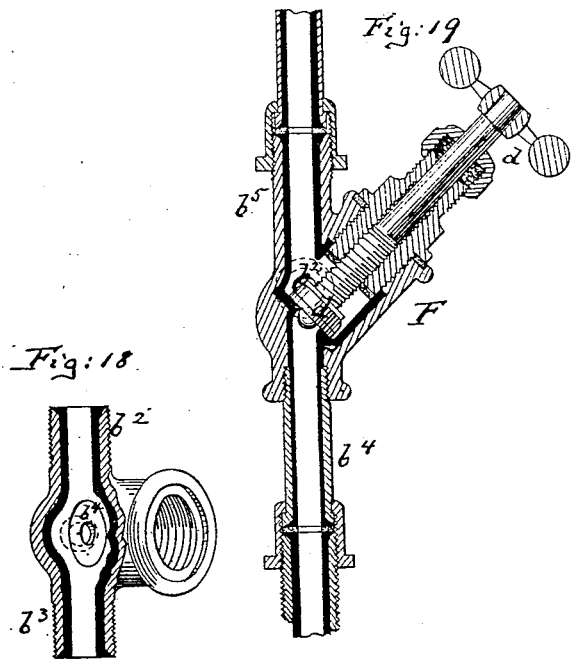
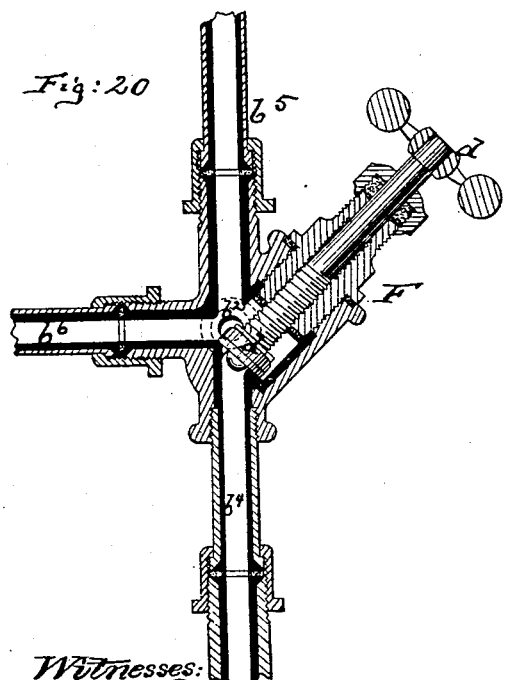
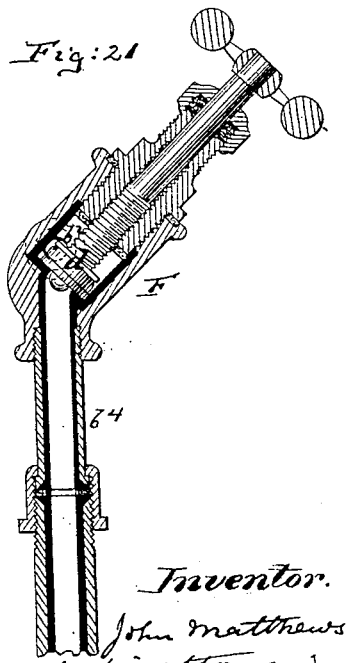
Witnesses:
Henry T. Parker
John C. Tunbridge
Inventor.
John Matthews
by his attorneys
Briesen & Betts

UNITED STATES PATENT OFFICE.

JOHN MATTHEWS, OF NEW YORK, N. Y.

APPARATUS FOR CHARGING PORTABLE FOUNTAINS WITH AERATED BEVERAGES.

SPECIFICATION forming part of Letters Patent No. 246,967, dated September 13, 1881.

Application filed July 6, 1881. (No model.)

*To all whom it may concern:*

Be it known that I, JOHN MATTHEWS, of New York, in the county and State of New York, have invented an Improved Apparatus for Charging Portable Fountains with Aerated Beverages, of which the following is a specification.

Figure 1 is a perspective view of my improved apparatus for charging portable fountains with aerated beverages. Fig. 2 is an end elevation of the same. Fig. 3 is a side view of the tilting or balancing portion of the apparatus; and Fig. 4 is a plan or top view of said balancing apparatus. Fig. 5 is a similar view as Fig. 3, only showing the tilting apparatus in a different position. Fig. 6 is a detail top view of the rock-shaft and its cranks and levers for operating the gas and water cocks that control the supply of gas and water to the portable fountain. Fig. 7 is a detail cross-section through said rock-shaft, showing the valve-operating cranks thereon. Fig. 8 is a detail longitudinal section of the knife-edge pivot on which the balancing-platform is supported. Fig. 9 is a top view thereof; Fig. 10, a detail cross-section of the support and cover of said knife-edge pivot. Fig. 11 is a vertical central section, on an enlarged scale, of the water-supply cock. Fig. 12 is a horizontal section thereof on the line *c c*, Fig. 11; Fig. 13, a horizontal section thereof on the line *c k*, Fig. 11. Fig. 14 is a vertical central section of the gas-supply cock; Fig. 15, a horizontal section on the line *k k*, Fig. 14; and Fig. 16, a horizontal section on the line *q q*, Fig. 14. Fig. 17 is a perspective view of one of the cocks placed on the storage-reservoirs. Fig. 18 is a horizontal section thereof on the line *k q*, Fig. 17. Fig. 19 is a vertical central section of the cock shown in Fig. 17. Figs. 20 and 21 are similar sections of modified forms of said cocks.

This invention relates to a new apparatus for charging portable fountains or other vessels with soda-water or other aerated beverages, and pertains more particularly to that class of charging apparatus which first supplies the portable fountain or vessel with gas and then with liquid, so that the surplus gas will be ejected by the liquid.

One part of the invention is to so construct the apparatus that each fountain will receive the exact quantity of liquid and gas prescribed, no more nor less, and so that the valves that control the supply will be automatically closed the moment the prescribed amount of aerated liquid has been introduced into the fountain.

Hence the invention consists, first, in providing such apparatus with means for automatically closing the supply-valves. This I do by means of a balanced platform, upon one end of which the fountain to be filled is placed, and the other end of which is weighted. When the fountain has been charged to the desired extent its weight will overcome that of the platform, causing the same to tilt, and thereby to set in motion devices for closing the supply-valves.

The invention also consists in various details of construction and combination of parts for actuating said valves and for facilitating the movement of the fountain on and with the swinging platform. Thus, for example, the cranks or arms of the rock-shaft that is set in motion by the tilting platform are so set with reference to the gas and water supply valves that when the charging commences gas will first be let into the fountain, and afterward the water, so that the surplus gas may be driven out by the water. Again, the connection between the portable fountain and the storage-reservoirs is, in part, flexible tubing, which permits the up-and-down movement of the fountain. In order to protect this tubing against the tendency of the gas and water under pressure to straighten its curved portions on the principle of the Bourdon pressure-gage, which straightening would be liable to affect the balance of the fountain, these flexible parts are inclosed within curved jackets of rigid or other suitable material. These jackets keep the curved parts from being distended or straightened out by the pressure within the tubes, and at the same time do not interfere with the proper movement of the tubes in the closing of the supply-valves.

My invention also consists in a new construction and arrangement of cocks placed on the storage-reservoirs, and also in the method of charging fountains from separate storage-reservoirs, one of which contains gas and the other water, the water being under pressure greater than that of the gas, so that it may perform its function of ejecting the surplus gas from the fountain.

I shall now proceed to more fully describe my improved apparatus and process.

In the accompanying drawings, the letter A represents the generator, in which is evolved the carbonic-acid gas or whatever gas it may be desired to introduce into the portable fountain.

B, B', B², and B³ are storage-reservoirs placed on a suitable frame.

D E is the portable fountain to be charged.

The gas-generator A connects by a pipe, $a$, with the reservoir B; but this pipe $a$ is continued beyond the reservoir B, as shown at $a'$, $a^2$, and $a^3$, so as to permit communication with all the other reservoirs, B', B², and B³. At the junction of this gas-pipe with each of the reservoirs is a cock, F, of the construction more clearly shown in Fig. 17. This cock has four branches or tubes, as shown in Fig. 17, and represents in that figure more clearly the connection between the branch pipes $a^2$ and $a^3$ on the reservoir B². The pipe $a^2$ joins the branch $b^2$. The pipe $a^3$ joins the branch $b^3$ of said cock. The downwardly-extending pipe $b^4$ of the cock connects with the reservoir B², and the upwardly-extending branch $b^5$ connects with the gas-pipe G, that leads to the fountain E to be filled. The valve proper, $d$, is placed in an inclined or oblique position into a tubular extension of the cluster of branch pipes, as shown in the sectional view, Fig. 19, and prevents or establishes communication between the pipes $a^2$ $a^3$ and the storage-reservoir B², but can never be used to intercept communication between the pipe $a^2$ and $a^3$, or between either of them and the pipe G. The inclined or oblique position of the valve $d$ permits this arrangement, as will be clearly apparent from an inspection of Fig. 19, and is preferably constructed with an inclined valve-seat, as shown. In Fig. 21 is shown the construction of this cock without the upwardly-extending branch $b^5$, it being in every other respect the same as that shown in Figs. 17 and 19. This construction is advantageously used on the reservoirs B' and B³. The device shown in Fig. 17 also shows the cock used to connect the pipe $a$ with the reservoir B, with the exception that on the reservoir B the branch $b^2$ will be omitted, the pipe $a$ connecting with the branch $b^5$, the pipe $a'$ with the branch $b^3$, and the reservoir with the branch $b^4$. The pipe $a$ has also a separate cock, $a^8$, to throw the generator A into or out of communication with the reservoirs.

The cock shown in Fig. 20 is a modification of that shown in Fig. 17, and shows merely an additional branch, $b^6$, which may lead to a gage or to another fountain, if desired. The reservoirs B B' B² B³ are also connected with each other by a further system of pipes (marked $e'$, $e^2$, and $e^3$,) which, where they connect with the said reservoirs, are coupled to cocks F of the construction already described; and the cock F, joining such pipes $e'$ $e^2$ on one of the reservoirs—for example, the reservoir B'—connects by a pipe, H, with the fountain E to be filled. The pipe H, however, can at any time be put in communication with either of the other reservoirs, B² or B³, by simply setting the valves $d$ so as to establish the requisite connection.

In use, and for the purpose of filling the fountain E, I prefer to fill the reservoir B with gas, and the other reservoirs, B', B², and B³, with water, and I charge the gas-reservoir B to a pressure of, say, 150°, while I charge the other reservoirs to a greater pressure—say 160°. The charge of the reservoirs B' B² B³ with so much gas as is needed to obtain the necessary pressure is made from the generator A through the pipe $a$ and its branches.

The pipes G and H lead to a stationary frame, I, into the upper end of which they are secured, as shown, by certain couplings, J and M, and from each of these couplings a flexible pipe extends to the fountain E. In Fig. 1 is clearly shown a flexible pipe, G², which is the continuation of the pipe G, and a pipe, H², which is the continuation of the pipe H. These two flexible pipes connect with the fountain E by a clamping device, T, of the construction set forth in my application for a patent therefor, which was filed on the 14th day of February, 1881. (Serial No. 26,039.) Such clamping device T therefore does not make part of the present invention. In Figs. 11 and 14 are shown couplings that join the said flexible pipes, respectively, to the rigid supply-pipes. The coupling J (shown in Fig. 11) is an L-shaped pipe, which, where it passes through the upper board of the frame I, is made square, as shown in Fig. 12, or otherwise shaped to prevent it from turning. The vertical branch of this coupling-pipe J connects with the pipe H. Its horizontal branch connects with the pipe H². At the junction of these two branches is the seat for a valve, L, that seats itself from above and closes communication between the pipes H and H² whenever it is allowed to drop upon its seat, as shown in Fig. 11.

The coupling-piece M (shown in Fig. 14) is intended to connect the gas-pipe G with the flexible pipe G², and is in every respect substantially of the same construction as the piece J already described, containing, also, a valve, N, which, when in its lower position, prevents communication between the pipes G and G².

The stems of the valves L and N extend downward below the coupling-pipes, and are grasped between suitable shoulders $f$ and $g$ by the forked arms of the operating-cranks $h$ and $i$, that are rigidly fastened to a rock-shaft, O, that is hung in the frame I. This rock-shaft has also a projecting handle or lever, $j$, which, when moved downward, causes the cranks $h$ and $i$ to pull the valves L and N shut, but which, when moved upward, pushes said valves open. The cranks $h$ and $i$ are so placed upon the rock-shaft O that the valve N will be opened before the valve L is opened, so that the fountain E may first be charged with gas and afterward with water. Fig. 7 shows the relative positions of these cranks on the rock-shaft. The cranks can be readily adjusted to the desired angle on the shaft O.

The fountain E is placed upon a platform, P, which is pivoted in the lower part of the frame I by a knife-edge pivot, $l$, or in any other suitable manner. That end of the platform P upon which the fountain E is not to be placed is weighted, as shown at $m$ in Figs. 1, 3, and 5. The knife-edge pivot $l$, which rests on a supporting-bracket, $n$, that is rigidly secured in the frame I, as shown in Fig. 8, is by preference made at the ends of a metallic bar, $l^2$, that is bolted to the platform P; and above the said bar I prefer to secure to the frame I a stationary cap, $p$, which prevents dust and other impurities from reaching the knife-edge pivot and interfering with the exactness of the motion of the platform P. From the platform P, on the same side of the pivot $l$ on which the fountain E stands, project upward posts or standards $r$, which are braced by suitable braces, $s$, or otherwise made rigid, and which move up or down on the tilting platform the same as the fountain E. These posts serve to hold in place a crook or pusher, $t$, (shown in Fig. 1 and by dotted lines in Fig. 5.) Against the end of this crook or pusher is placed, in a slightly-inclined position, a weighted lever, R, which is pivoted in the frame I at $u$, and which carries at its face a friction-roller, $w$. This friction-roller, when the lever R is raised into the position shown in Fig. 5, is just beneath the lever $j$, holding it up, and holding thereby the valves L and N open. As the fountain E is becoming filled its weight increases, and when it has been completely charged its weight exceeds that of the counter-weight $m$, whereupon the fountain E will descend, causing the platform P to swing and the crook $t$ to push against the raised lever R, causing said lever, under the influence of its weight $x$, to drop into the position which is shown in Fig. 3, and thereby taking the supporting-wheel $w$ away from under the lever $j$, and allowing said lever, which is also, if desired, weighted at its free end, to drop and swing the rock-shaft O. This motion of the rock-shaft lowers the cranks $h$ and $i$ and closes the valves L and N.

The framing $r$ $s$, that extends upward from the platform P, may, if desired, be provided at or near its upper portion with an outwardly-projecting graduated arm, $y$, from which a sliding weight, $z$, is suspended, so that by this means the apparatus may be adjusted to suit heavier or lighter, larger or smaller, fountains that are placed upon the platform, and also to regulate with great nicety the specific amount of liquid and gas with which the fountain is to be charged.

The flexible pipes $G^2$ $H^2$, that extend from the couplings J and M to the clamp T, pass through curved metallic jackets or pipes S, which prevent them from becoming straightened under the influence of the pressure of the gas. These metallic pipes or jackets are preferably suspended by suitable springs, $d^2$, from a projecting arm of the frame I, so as by this connection not to interfere with the freedom of movement of the pipes $G^2$ and $H^2$ in the act of coupling and uncoupling any portable fountain.

The operation is as follows: Supposing the reservoir B to be charged with gas at a pressure of about one hundred and fifty pounds, and the reservoir B' to be charged with carbonated water to two-thirds its total capacity, the remaining third being filled with compressed gas, which serves by its elastic force to discharge the water through the pipe H, which extends to the lower part of the reservoirs, and is open at its lower end to receive the water at a pressure of about one hundred and sixty pounds—at any rate at a pressure in excess of the gas-pressure in reservoir B—the gas-pipe G being in communication with the coupling M, and this in turn with an empty fountain, E, placed on the platform P, and the water-pipe H likewise in communication with that fountain, and the lever R to be still in its lower position, which is shown in Fig. 1, the attendant, as soon as charging is to begin, raises the lever R into the position shown in Fig. 5, thereby rocking the shaft O and lifting first the gas-valve N and afterward the water-valve L. It takes but a moment to charge the the fountain E with gas from the reservoir B. Hence, by the time the water-valve L is opened the fountain E is already charged with gas at a pressure of about one hundred and fifty pounds to the square inch. The carbonated water under greater pressure now enters the fountain E and displaces the gas to the desired extent, causing it to travel back to the reservoir B through the pipe through which it came until the fountain is heavy enough to cause the platform P to tilt and the valves L and N to be shut. The fountain can then be properly uncoupled from the pipes $G^2$ $H^2$ and replaced by another.

All the reservoirs may be charged with carbonated water at one pressure and set at a sufficient elevation above the portable fountain. The portable fountain may then be charged with gas from the top of the reservoirs, and the carbonated beverage will flow into the fountain by gravity from the bottom of the reservoirs and displace the gas, which will flow back to the top of the reservoirs, as more fully shown in my Letters Patent No. 243,148, dated June 21, 1881.

When one of the water-reservoirs is empty another is put in communication with the pipe H. The empty reservoirs are filled during the time that the full reservoir is being used for charging fountains. Thus the apparatus may be used continuously.

I claim—

1. The cock F, constructed with three or more tubular branches, $b^2$ $b^3$ $b^4$, and with the inclined or obliquely-placed valve $d$, facing an oblique valve-seat, all arranged so that by said valve communication with only one of said branches can be shut off or established, as described.

2. In a soda-water apparatus, the combination of the gas-reservoir B and water-reservoir B' with the gas-pipe G G² and water-pipe H H², and with the fountain E to be charged, all arranged for operation substantially as herein shown and described.

3. The combination of the charging-reservoir B B' and connecting-pipes G G² and H H² with the fountain E to be charged, and with the pivoted weighted platform P, upon which the fountain E is placed, substantially as specified.

4. The combination of the tilting platform P, having the projection $t$ thereon, with the weighted lever R, rock-shaft O, having lever $j$ and cranks $h$ and $i$, and with the valves L and N, all arranged for operation substantially as specified.

5. The combination of the fountain E with the tilting platform P and with the supply-pipes G² and H², having valves L and N, all arranged so that when the fountain is full and weighted the said valves will be automatically closed, substantially as specified.

6. The combination of the elastic pipe G², which connects the pipe G and fountain E, with the metallic curved jacket S, substantially as described.

7. The combination of the tilting platform P, adapted to receive the fountain E, and provided with the projection $t$ for closing the valves L N, with the projecting graduated arm $y$ and weight $z$, substantially as specified.

8. The combination of the tilting platform P and mechanism, substantially as described, for automatically closing the supply-valves with the flexible connecting-pipes G² H², curved metallic jackets S S, and suspension-springs $d^2$, substantially as specified.

9. The platform P, provided with the cross-bar $l^2$, formed into knife-edge pivots $l$ at its ends, in combination with the supporting-brackets $n$ and covering-shield $p$, substantially as described.

JOHN MATTHEWS.

Witnesses:
F. MATTHEWS,
JOHN D. WILSON,